United States Patent [19]

Rowan

[11] Patent Number: 5,709,762
[45] Date of Patent: Jan. 20, 1998

[54] METHOD FOR MAKING REINFORCED FLEXIBLE DUCTING

[75] Inventor: Gene R. Rowan, Dickinson, Tex.

[73] Assignee: Karen F. Hurwitz and Daniel N. Lundeen, P.C., Houston, Tex.

[21] Appl. No.: 379,748

[22] Filed: Jan. 27, 1995

[51] Int. Cl.$^6$ .................................................. B65H 81/00
[52] U.S. Cl. ........................ 156/195; 156/171; 156/179; 156/432
[58] Field of Search ........................ 156/171, 179, 156/184, 187, 188, 190, 195, 425, 429, 430, 431, 432

[56] References Cited

U.S. PATENT DOCUMENTS

| | | | |
|---|---|---|---|
| 2,405,909 | 8/1946 | Smith et al. | 156/195 X |
| 3,230,123 | 1/1966 | Christensen | 156/195 |
| 3,457,130 | 7/1969 | Morrison | 156/195 X |
| 3,470,051 | 9/1969 | Meyer | 156/171 |
| 3,663,330 | 5/1972 | Sager | 156/190 |
| 4,106,968 | 8/1978 | Kutnyak et al. | 156/195 X |
| 4,459,168 | 7/1984 | Anselm | 156/195 X |

*Primary Examiner*—James Engel

[57] ABSTRACT

Disclosed are an apparatus for manufacturing flexible, reinforced ducting, a method for making flexible, reinforced ducting and a flexible, reinforced ducting article of manufacture. A wheel carrying spools of reinforcing string rotates at a rate synchronous to a mandrel preparing a laminated ducting wall to lay down a longitudinal string reinforcement between the layers of the laminated wall.

5 Claims, 1 Drawing Sheet

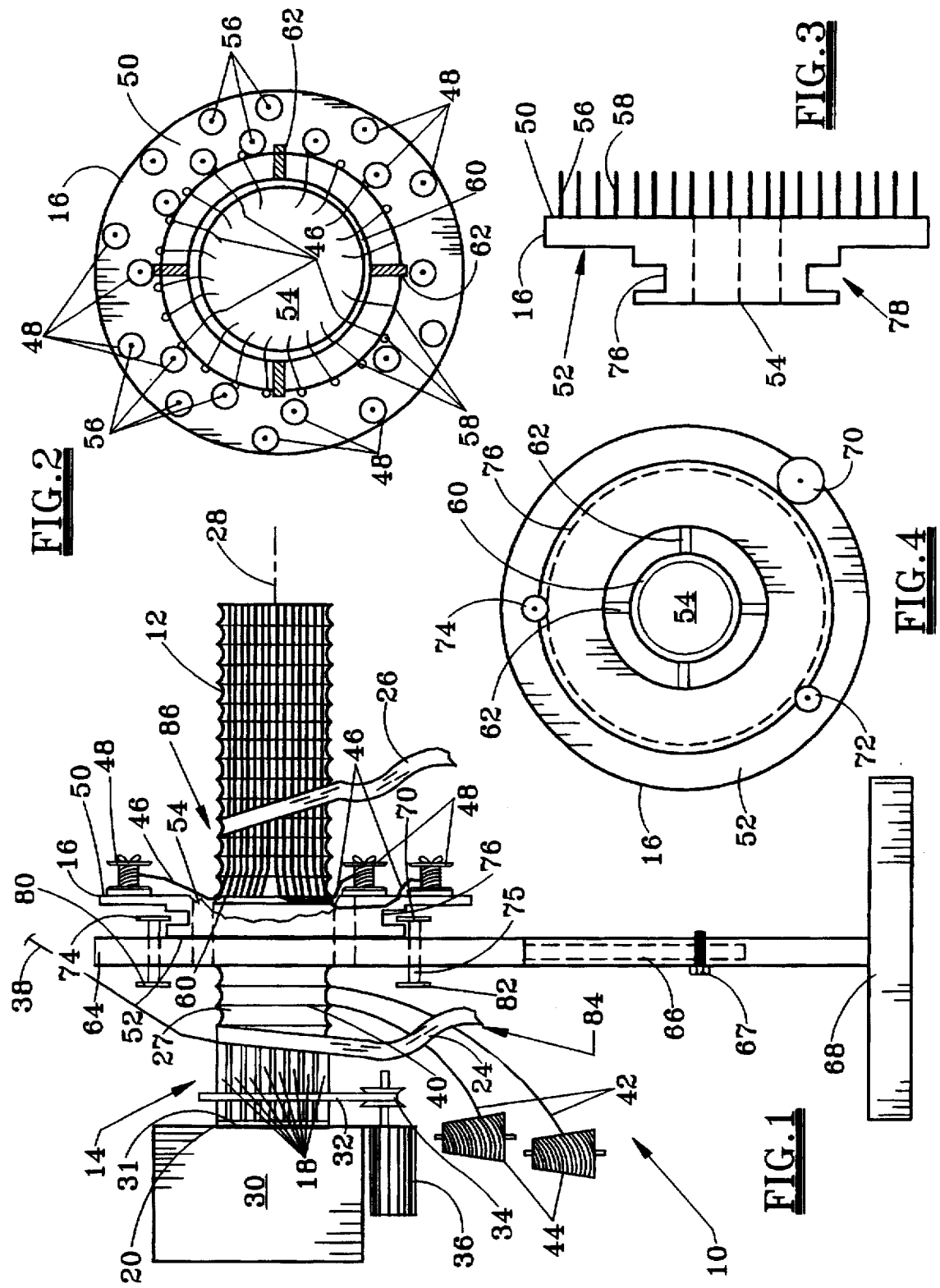

METHOD FOR MAKING REINFORCED FLEXIBLE DUCTING

FIELD OF THE INVENTION

The present invention relates to a flexible duct made from a ducting material having a longitudinally oriented reinforcement and an apparatus for introducing the longitudinal reinforcement into the ducting material.

BACKGROUND OF THE INVENTION

Flexible ducts are commonly used in buildings to carry conditioned air from a utility space where an air conditioner or heater is located to a work or living space. The ducts are typically connected at one end to an outlet header of the air conditioner/heater unit and at the other end to a vent located in a room to be air conditioned/heated so that the body of the duct extends in a hidden fashion through the utility space.

Such ducts are typically made from a flexible core comprising a plastic material and surrounded by insulating and protecting layers. The plastic core generally includes a helical wire skeleton and optional radial reinforcement laid down concurrently with the wire.

Applicant is, however, unaware of a duct core having longitudinal reinforcement laid down concurrently with the wire and any radial reinforcement so that the longitudinal reinforcement is substantially transverse to the wire and radial reinforcement to form a reinforcement grid in the ducting material. Such a reinforcement grid would be substantially more resistant to tearing than ducting without the longitudinal reinforcement.

SUMMARY OF THE INVENTION

By concurrently laying down longitudinal reinforcement in a plastic ducting material of a duct core and/or jacket, the reinforced ducting, thus manufactured, is substantially more resistant to tearing than ducting without the longitudinal reinforcement.

In one embodiment, the present invention provides an apparatus for manufacturing reinforced flexible ducting prepared by spirally winding and laminating a plurality of tapes on a mandrel. The apparatus comprises a wheel having a central opening larger than a diameter of the mandrel. A frame is provided for rotatably supporting and positioning the wheel to concentrically receive the mandrel through the central opening between first and second tape uptakes. A drive is provided for rotating the wheel about the mandrel. A plurality of spools mounted on the wheel are provided from which string can be generally continuously drawn. A guide ring mounted on the wheel adjacent the central opening is provided to facilitate generally continuous feeding of the string onto the mandrel between the first and second tape uptakes to lay the strings longitudinally into the ducting between layers of the first and second tapes. The drive is preferably adapted to match the rotational speed of the wheel to that of the ducting on the mandrel. The drive for rotating the wheel is preferably coupled with a mandrel drive for rotating the wheel at a speed proportional to a rotational speed of the ducting on the mandrel.

As another embodiment, the present invention provides a method for making reinforced flexible ducting. As a first step, a plurality of tapes are spirally wound and laminated on a mandrel to form a flexible ducting. A wheel is positioned to concentrically receive the mandrel through a central opening of the wheel between adjacent uptakes of respective tapes. A plurality of spools are mounted on the wheel. The wheel is rotated to match the rotational speed of the ducting on the mandrel. Strings are generally continuously drawn from the spools, and the strings are guided adjacent to the mandrel and between adjacent layers of the tapes to form a laminated duct with longitudinal string reinforcement. A wire is preferably spirally wound between adjacent tape layers. Reinforcing string is preferably spirally wound between adjacent tape layers. Preferably, an upper surface of a first tape is coated with an adhesive for uptake into the ducting before passage through the central opening of the wheel, and a lower surface of a second tape is coated with an adhesive for uptake into the ducting after passage through the central opening of the wheel, or both the respective upper and lower surfaces of the first and second tapes are so coated. The driver of the mandrel is preferably coupled to the wheel to synchronously rotate the wheel with the ducting on the mandrel.

As a further embodiment, the present invention provides a flexible reinforced ducting. The ducting comprises inner and outer layers of tape spirally wound and laminated into a duct wall. A spirally wound wire is preferably laminated between the inner and outer tape layers. Spirally wound string can be laminated between the inner and outer tape layers. A plurality of radially spaced, longitudinally oriented strings are laminated between the inner and outer tape layers. A layer of adhesive is preferably disposed between opposing surfaces of the inner and outer tapes. A layer of insulation can be disposed adjacent the inner or outer tape layer, depending on whether the laminate is used as an inner core or outer protective layer.

BRIEF DESCRIPTION OF THE DRAWINGS

FIG. 1 is a representational side view of the longitudinally reinforced duct manufacturing apparatus of the present invention partially cut away at the spinning wheel 16 to show the guide ring 60 in the annulus 54.

FIG. 2 is a frontal view of the spinning wheel 16 of the apparatus of FIG. 1 showing a staggered placement of spools and the guide ring 60.

FIG. 3 is a side view of the spinning wheel 16 of FIG. 2 showing the drive groove 76 and the pegs 56 and eyelets 58.

FIG. 4 is a rear view of the spinning wheel 16 of FIG. 2 showing an orientation of the three support rollers 70, 72, 74 mounted in the groove 76 for rotating the wheel 16 about the frame 64.

DETAILED DESCRIPTION OF THE INVENTION

Referring to FIGS. 1-4, an apparatus 10 suitable for manufacturing a flexible ducting core 12 having longitudinal reinforcement in accordance with the present invention includes a cylindrically shaped mandrel 14 and an annular spinning wheel 16. The mandrel 14 comprises a plurality of concurrently rotating rods 18 disposed along the perimeter of a first support plate 20 at a proximal end and a second support plate at a distal end (not shown) so that an outer surface of the mandrel is substantially circular. Concurrent rotation of the rods 18 induces a virtual standing rotation in the mandrel 14 suitable for spirally winding one or more feed strips 24, 26 of a plastic tape into a tubular section 27 which rotates along an axis 28 at the speed of the mandrel 14.

The proximal support plate 20 is mounted to a base 30 which supports the mandrel 14 in a cantilevered fashion. The proximal and distal support plates include bearings (not shown) such as a ball bearing at plate connection points 31. The rods 18 can be concurrently rotated by any suitable means including independent motors. However, the rods 18 are conveniently rotated concurrently by a belt 32 attached by pulley 34 to a motor 36.

As is known in the art, the rods 18 are axially offset a sufficient radius to induce the tapes 24, 26 to be wound spirally so that the tube 27 formed thereby regularly increases in length. Thus, a fixed position of the distal plate (not shown) is offset radially from a fixed position of the proximal plate 20 sufficiently to establish the offset position of the rods 18.

The plastic tapes 24, 26 which are fed to the mandrel 14 and spirally wound thereby are prepared in a conventional fashion. Precut to a desired width such as 1 to 6 inches, or more, the tapes 24, 26 are coated with a suitable adhesive and dried to a suitable tackiness. Means for coating and drying tape are well known in the art. The tapes can be made of any suitable material having sufficient film-forming properties including metals, paper, fiberglass, textiles, plastics and composites thereof. Plastic materials such as polyester, polyolefin, PVC, and the like are preferred for most conventional duct applications.

Typically, the first tape 24 is coated with adhesive on an upper surface away from that of the mandrel 14 to avoid sticking thereto. Once formed into the tubular section 27 having an exposed upper adhesive laminate surface, reinforcement can be introduced to stick to the exposed adhesive surface. Then the second tape 26 having a lower adhesive surface is introduced to adhere to the exposed adhesive laminate surface, imbed the reinforcement, and form an upper laminate surface to complete the ducting core 12 composite composition (film-reinforcement-film).

Among conventional reinforcements are a wire 38 fed from a spool (not shown) and pretensioned (to a suitable radius) by means (not shown) so that the tension of a spring 40 thus formed in the tubular section 27 has force suitable to maintain the plastic ducting core 12 at a substantially uniform diameter. Additional reinforcement generally includes one or more strings 42 fed from spools 44 through eyelets (not shown) which wind spirally around the tubular section 27 and reinforce a radial dimension of the core 12. The wire 38 is not generally employed when the laminate is to be used as an outer protective layer, e.g. a jacket over insulated ducting.

In the practice of the present invention, a plurality of reinforcement strings 46 are also introduced along the longitudinal dimension of the tubular section 27 for further reinforcement and substantially forming a reinforcing grid between the upper and lower layers of the core 12 wherein the longitudinal strings 46 are wound on spools 48 spaced around the circumference of a front surface 50 of the wheel 16 (as best seen in FIG. 2). The wheel 16 rotates substantially synchronously with the mandrel 18 to lay down the strings substantially longitudinally (parallel to the core axis).

The annular wheel 16 as mentioned above includes a spool carrying front surface 50, a rear surface 52 and a concentric annular opening 54 for the core 12 to extend through. Sufficient quantity of spools 48 are mounted to the front surface 50 to permit a desired spacing of strings 46 longitudinally around the circumference of the core 12. The placement of the spools 48 is preferably substantially regular about the radius of the wheel 16 but can be staggered with respect to the radius length. Staggered placement of spools 48 permit a greater number of larger spools to be mounted on the wheel 16 without having to increase the diameter thereof.

The spools 48 are removably secured to pegs 56 affixed to the front surface 50 suitable to permit the spools to rotate on the pegs 56 as the string becomes unwound therefrom and to permit easy replacement when a spool 48 is empty. The pegs 56 typically have an eyebolt connection (not shown) which can be removed and replaced by hand to secure the spools 48 to the wheel 15. The spools are preferably made from a high lubricity material such as TEFLON plastic.

The strings 46 are threaded through an eyelet 58 affixed to the front surface 50 of the wheel 16 adjacent each spool 48 to guide the strings 46 and prevent entanglement. Following the eyelets 58, the strings 46 are preferably threaded though a circular guide 60 concentrically mounted in the annular opening 54 of the wheel 16.

The guide ring 60 has a plurality of eyelet openings (not shown) with at least one eyelet corresponding to each thread. The eyelets (not shown) are preferably evenly distributed around the guide ring 60 corresponding to a circumferential position of a spool on the wheel 16 so that the longitudinal strings 46 can be substantially evenly introduced around the circumference of the core 12.

The guide ring 60 preferably has a diameter similar in size to that of the core 12 which permits the core 12 to pass therethrough. The guide ring 60 is mounted to the wheel 16 in the annular opening 54 by brackets 62 affixed by bolts (not shown). It can be seen that the diameter of the annular opening 54 and guide 60 will depend on the diameter of the core 12 being made. The size of the guide 60 can adjusted by replacement thereof with one which is larger or smaller. The wheel 16 can also be replaced with a larger one if required.

The wheel 16 is rotatably supported by a frame 64 which is preferably attached to adjustable telescoping legs 66, key 67, and stand 68 so that the wheel 16 can be conveniently positioned with respect to the mandrel 14 to line up the annular opening 54. The frame 64 includes a plurality of support rollers 70, 72, 74 rotatably attached thereto on a shaft 75 having a bearing (not shown) to support and rotate the wheel 16. At least three rollers 70, 72, 74 are preferred for stability of the rotating wheel 16. However, it is recognized that the means for supporting the wheel 16 for rotation can vary in accordance with practitioner preference and variation thereof is within the scope and spirit of present invention.

The support rollers 70, 72, 74 are rotatably mounted to the frame 64 in bearings (not shown) so that an end thereof is secured in a groove 76 formed on a diameter recess 78 of the rear wheel surface 52. Lower support rollers 70, 72 substantially support the weight of the wheel 16 and the upper support roller 74 substantially acts as a guide. The guide roller 74 can be mounted to a cam (not shown) secured by bolt 80 so that rotation of the cam raises and lowers the wheel end from the groove 76 for easy removal of the wheel 16 from the support frame 64.

One or more of the support rollers 70, 72, 74 can be drive rollers for rotating the wheel 16. In a preferred embodiment of the present invention, a single drive wheel 70 having a suitable drive means (not shown) is employed for reduced complication. Examples of suitable drive means include direct connected motors, pulley drives having a pulley 82, geared drives and the like. The drive means (not shown) can have a transmission and control means suitable for ensuring synchronization of the rotation of the wheel 16 to the rotation of the mandrel 18. The pulley 82 can be connected by a belt (not shown) to the motor 36 for synchronicity to the mandrel 14.

To begin manufacture of the flexible ducting core 12 of the present invention having longitudinal reinforcement strings 46, the spinning wheel 16 is positioned via the stand 68 between proximal and distal uptakes 84, 86 of the tapes 24, 28 generally with the mandrel 14 distal end (not shown) concentrically extending through the wheel opening 54. An end of the tape 24 is then physically guided by hand to the mandrel proximal uptake 84 so that the tape 24 begins to wind spirally about the mandrel 14 with adjacent edges of each helical loop made partially glued to each other to form the tubular section 27.

The wire 38 and radial reinforcing strings 42 are threaded through respective eyelet guides (not shown) and attached to the exposed adhesive surface so that the wire 38 and radial strings 42 are continuously drawn by the rotating mandrel 14 to form a spiral skeleton of the ducting core 12. Next, the longitudinal reinforcing strings 48 are threaded through the eyelets 58 and the guide ring 60 eyelets (not shown) and manually attached to the adhesive surface of the tubular section 27 so that the strings 46 are continuously drawn. Rotation of the wheel 16 is then begun simultaneously with the rotation of the mandrel 14 so that the strings 46 are laid down parallel to the axis without spiral offset.

Lastly, an end of the tape 26 which is to form the top laminate surface of the core 12 is manually adhered to the exposed surface (having the laid down reinforcement) at the distal mandrel uptake 86. The distal tape 26 is then drawn by rotation of the mandrel 14 and tubular section 27 to laminate the lower layer and complete the core 12.

Once started, the apparatus 10 can be run continuously to produce multiple desired lengths of the core 12. Lengths of the core 12, can be cut, for example, by a knife means (not shown) penetrating the bottom of the core 12 for a single rotation thereof.

Individual lengths of the ducting core 12 can be surrounded with one or more layers of insulation (not shown) to form a strong, flexible duct of the present invention suitable for use in transporting conditioned air in most commercial and residential buildings. A protective jacket made in the same way with the longitudinal reinforcement is desirably used to cover the insulation.

The present ducting manufacturing apparatus is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

I claim:

1. A method for making reinforced flexible ducting, comprising the steps of:

spirally winding and laminating from orbitally fixed positions a plurality of tapes on a mandrel to form a flexible ducting;

positioning a wheel to concentrically receive the mandrel through a central opening of the wheel between adjacent uptakes of respective tapes;

mounting a plurality of spools on the wheel;

rotating the wheel to match a rotational speed of the ducting on the mandrel;

generally continuously drawing strings from the spools, and guiding the strings adjacent to the mandrel and between adjacent layers of the tapes to form a laminated duct with longitudinal string reinforcement.

2. The method of claim 1, including the step of spirally winding a wire between adjacent tape layers.

3. The method of claim 2, including the step of spirally winding reinforcing string between adjacent tape layers.

4. The method of claim 1, comprising coating an upper surface of a first tape with an adhesive for uptake into the ducting before passage through the central opening of the wheel, coating a lower surface of a second tape with an adhesive for uptake into the ducting after passage through the central opening of the wheel, or so coating both of the respective upper and lower surfaces of the first and second tapes.

5. The method of claim 1, comprising the further step of coupling a driver or drivers of the mandrel and wheel to synchronously rotate the wheel with the ducting on the mandrel.

* * * * *